United States Patent Office 3,386,972
Patented June 4, 1968

3,386,972
COPOLYMERS OF SULFUR DIOXIDE AND ALLYLTHIOUREAS
John B. Gardner and Billy G. Harper, Lake Jackson, Tex., assignors to The Dow Chemical Company, Midland, Mich., a corporation of Delaware
No Drawing. Filed July 16, 1965, Ser. No. 472,675
3 Claims. (Cl. 260—79.3)

ABSTRACT OF THE DISCLOSURE

Polysulfones are prepared by reacting sulfur dioxide with allylthioureas having the general formula

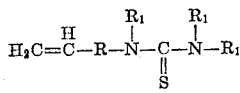

wherein R is an alkylene group having 1 to 4 carbon atoms and $R_1$ is either hydrogen or an alkyl radical having 1–4 carbon atoms. Ternary copolymers are prepared by reacting the above monomers with 0.1 to 5 percent by weight of a diethylenically unsaturated cross-linking agent, such as, 1,7-octadiene. The polymers are useful to chelate copper ions from solution.

---

The present invention relates to polymeric reaction products and more particularly to compositions obtainable by the reaction of sulfur dioxide with allyl thioureas.

Copolymers of sulfur dioxide and α-olefins, sometimes referred to as polysulfones, may be prepared as described in published literature, e.g., U.S. Patents 2,136,389, 2,602,787 and 2,797,205 and J. Am. Chem. Soc., vol. 65, pp. 2417 and 2418 (1943).

In accordance with the present invention, polysulfones are prepared by reacting sulfur dioxide with allyl thioureas having the general formula

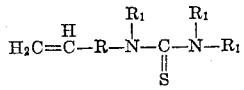

wherein R is an alkylene group having from 1 to 4 carbon atoms and $R_1$ is either hydrogen or an alkyl radical having 1 to 4 carbon atoms.

Illustrative examples of allyl thioureas which may be reacted with sulfur dioxide to prepare the polysulfones of the present invention include allyl thiourea itself, 1-(3-butenyl)-2-thiourea, 1-(5-hexenyl)-2-thiourea, 1-(3-butenyl)-3-methyl-2-thiourea, 1-(5-hexenyl)-3-methyl-2-thiourea, 1-(3-butenyl)-3-propyl-2-thiourea and 1-(5-hexenyl)-3-propyl-2-thiourea.

The polymerization is advantageously achieved by bulk polymerization although it can be achieved with an inert solvent such as hexane or kerosene or with excess sulfur dioxide as the reaction medium. Polymerization can be effected by aid of irradiation or by the presence of a chemical catalyst.

When irradiation is employed, the amount of radiation used is from about 0.02 to about 5.0 megarad, and preferably from 0.1 to 0.5 megarad. Any convenient source of gamma rays or high velocity electrons is satisfactory. The rate of radiation may be varied within known practical limits. A chemical catalyst may also optionally be present to supplement polymerization by irradiation, if desired. However, irradiation without the aid of chemical catalyst is a fully satisfactory procedure for effecting polymerization of the $SO_2$ and the allyl thiourea mixture.

Among chemical catalyst which may be employed to prepare the polymer are ionic-type catalysts, e.g., $AgNO_3$, $LiNO_3$ and $NH_4NO_3$ (sometimes referred to as a redox catalyst) and the peroxide-type free-radical initiating catalysts, e.g., methyl ethyl ketone peroxide. When an ionic type is employed, the amount is generally from about 0.001 to about 0.5 percent and when the free-radical initiating type is employed, the amount is usually from about 0.05 to 5.0 percent, based on the weight of the unsaturated allyl thiourea present.

In preparing the $SO_2$/allyl thiourea copolymers of the present invention, it is generally found that substantially equimolar proportions of the allyl thiourea and sulfur dioxide react together. However, starting molar ratios of sulfur dioxide to allyl thiourea can range from 1 to 50:1 or more to facilitate the polymerization of the reactants and to provide, if desired, a reaction vehicle of liquid sulfur dioxide.

Polymerization occurs at temperatures ranging from about —50° C. to 50° C. and preferably from 0° C. to 30° C. Sufficient pressure is employed to maintain the reaction mixture substantially completely in the liquid phase however, the autogenous pressure developed at the particular reaction conditions employed is preferred.

The sulfur dioxide/allyl thiourea copolymers are effective chelating agents exhibiting selectivity in chelating copper ions from aqueous solutions, and as such are valuable agents for the removal of copper ions in aqueous environments where the presence of such metal is objectionable and disadvantageous. In preparing copolymers with chemical catalysts useful as chelating agents it is desirable to include a minor amount e.g., 0.1 to 5.0 percent of a diethylenically unsaturated cross-linking agent such as divinyl benzene, or 1,7-octadiene in the polymerization reaction.

To illustrate the manner in which the invention may be carried out, the following examples are given. It is to be understood, however, that the examples are for the purpose of illustration and the invention is not to be regarded as limited to any of the specific materials or conditions recited therein.

EXAMPLE 1

In a citrate bottle containing 41 grams of ethanol was dissolved 11.2 grams of allyl thiourea. The solution was cooled to —40° C. and 318 grams of sulfur dioxide was added slowly to the solution. After the introduction of the sulfur dioxide, the bottle was capped and the reaction mixture was irradiated with gamma rays emitted from a cobalt 60 source, having an intensity of 0.2 megarad per hour, for 30 minutes at 0° C. for a total dose of 0.1 megarad. After irradiation, the excess $SO_2$ was evaporated, and the resulting polymeric product was filtered from the ethanol solution, and dried at 50°–60° C. in a vacuum oven.

A conversion based on allyl thiourea of 96 percent was obtained and an analysis showed the polymeric product contained 33.4 percent sulfur and 16.7 percent nitrogen by weight. Theoretical weight percentages based on a 1:1 monomer ratio of $SO_2$ to allyl thiourea calculated to be 35.5 and 15.6, respectively.

EXAMPLE 2

In a citrate bottle containing 39.3 grams of methanol was dissolved 10 grams of allyl thiourea (0.088 mole), 0.2 gram of 1,7-octadiene, (0.002 mole) a cross-linking agent and 0.08 gram of methyl ethyl ketone peroxide (0.0004 mole), the latter as catalyst. The solution was cooled to —40° C. and 371 grams of sulfur dioxide was added slowly to the solution, while the temperature of the reaction mixture was maintained below about —10° C. After the introduction of the sulfur dioxide, the bottle was capped and allowed to warm gradually to room temperature. Polymerization was complete after about two hours. The excess $SO_2$ was evaporated and the resulting polymeric product was filtered from the methanol solution, washed with additional methanol and dried at 50–50° C. in a vacuum oven. Conversion, based on allyl thiourea was about 50 percent.

The copolymer was a light-colored solid having a melting point of about 180° C. which was slightly soluble in water. Analysis of the copolymer showed that the molar proportion of $SO_2$ groups to the allyl thiourea was about 1:1.

To demonstrate the effectiveness of the copolymer prepared above as a chelating agent, 4.8 grams of the copolymer was stirred into 100 ml. of a 2 percent solution of $CuSO_4 = 5H_2O$ (this solution contained 0.505 gram Cu). The polymer was filtered, washed with distilled water, and the filtrate collected. The filtrate was found by analysis to contain 0.252 gram of copper ion.

In a similar manner, copolymers similar to the foregoing may be obtained when equivalent amounts of any of the other mentioned allyl thioureas are reacted with $SO_2$ in place of those set forth in the above examples.

What is claimed is:

1. A ternary copolymer polysulfone having the olefin polysulfone structure and which is the reaction product of sulfur dioxide, 0.1 to 5 percent by weight of a diethylenically unsaturated cross-linking agent and an allylthiourea having the general formula $$H_2C=\overset{H}{C}-R-\overset{R_1}{\underset{|}{N}}-\overset{}{\underset{\|}{C}}-\overset{R_1}{\underset{|}{N}}-R_1$$
$$\phantom{H_2C=C-R-N-}S$$

wherein R is an alkylene group having 1 to 4 carbon atoms and each $R_1$ is independently selected from the group consisting of hydrogen and alkyl group having 1 to 4 carbon atoms.

2. The copolymer of claim 1 wherein the alkyl thiourea is allyl thiourea.

3. The copolymer of claim 1, cross-linked with 0.1 to 5 percent by weight of 1,7-octadiene.

References Cited

UNITED STATES PATENTS

| | | | |
|---|---|---|---|
| 2,253,775 | 8/1941 | Frey et al. | 260—79.3 |
| 3,194,678 | 7/1965 | Caldwell | 260—79.3 |
| 3,297,664 | 1/1967 | Miskel et al. | 260—79.3 |

JOSEPH L. SCHOFER, *Primary Examiner.*

D. K. DENENBERG, *Assistant Examiner.*